Aug. 23, 1966  W. M. HODDINOTT  3,267,814
SAFETY COUPLER FOR FEED SCREW HANDLE
Filed Aug. 12, 1964  2 Sheets-Sheet 1

INVENTOR.
William M. Hoddinott
BY
*Ph. Smith*
ATTORNEY.

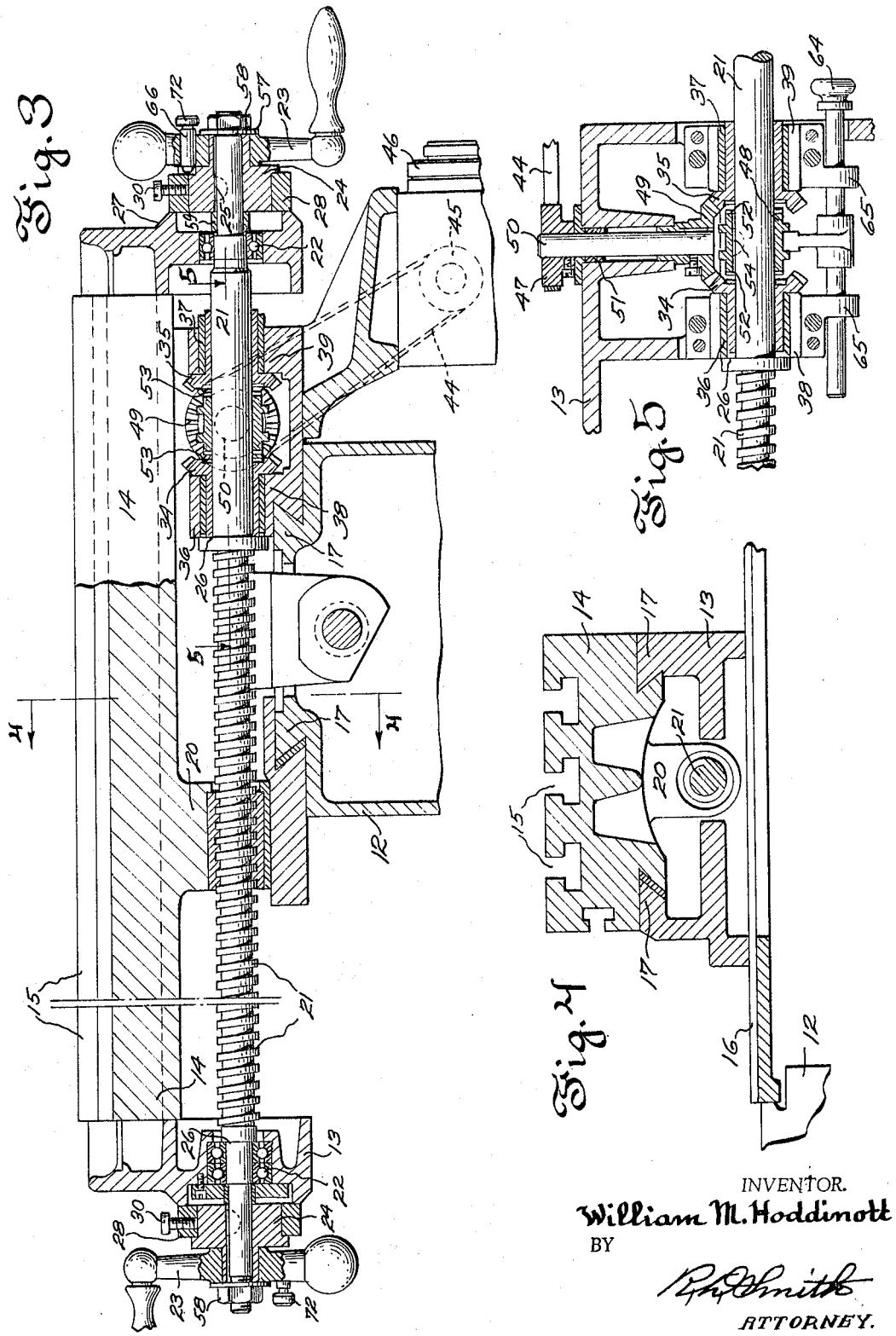

United States Patent Office 3,267,814
Patented August 23, 1966

3,267,814
SAFETY COUPLER FOR FEED SCREW HANDLE
William M. Hoddinott, Milford, Conn., assignor to The Bridgeport Machines, Inc., Bridgeport, Conn., a corporation of Connecticut
Filed Aug. 12, 1964, Ser. No. 389,166
5 Claims. (Cl. 90—21)

This invention relates to devices for determining whether or not the crank handle for manually turning the feed screw of a milling machine work carrier shall turn when the feed screw is rotated automatically by power. If screw driven rotation of such crank handle occurs at high speed the usual projecting position of the handle, as in a milling machine, is a danger to the operator of the machine whose clothing, if caught and entangled with a power rotated handle, may not be extricated in time to avoid personal injury.

Safeguards against such accidents heretofore proposed have involved a conditioning of the handle normally to be free of rotary interlock with the feed screw. This requires that the handle, when used to manually turn the feed screw, must be thrust bodily toward the machine for causing clutch engagement with the feed screw against the constant opposition of a declutching spring. Such clutch engaging thrust thus manually applied to the crank handle, must be maintained throughout the turning of the feed screw by hand. This is a tiring manner of operation and causes inconvenience and loss of time whenever the worktable of a machine tool must be fed a considerable distance by manually turning its feed screw. Such disadvantages are obviated by the present improvements.

An object of this invention is to enable the machine operator easily to condition the crank handle so that it may by choice be drivingly connected to, or free from rotary interlock with, the feed screw and to make each of such conditions self maintaining until purposely changed by the operator.

Another object is to avoid having to move the crank handle in an axial direction in order to determine whether it shall be interlocked with or uncoupled from the feed screw.

These and other objects of the improvements will be understood in further particular from the following description of a successful embodiment thereof having reference to the accompanying drawings wherein:

FIG. 3 is a view taken in section on the plane 3—3 in FIG. 1 looking in the direction of the arrows.

FIG. 4 is a view taken in section on the plane 4—4 in FIG. 3 looking in the direction of the arrows.

FIG. 5 is a fragmentary sectional view on the plane 5—5 in FIG. 3.

Figure 1:
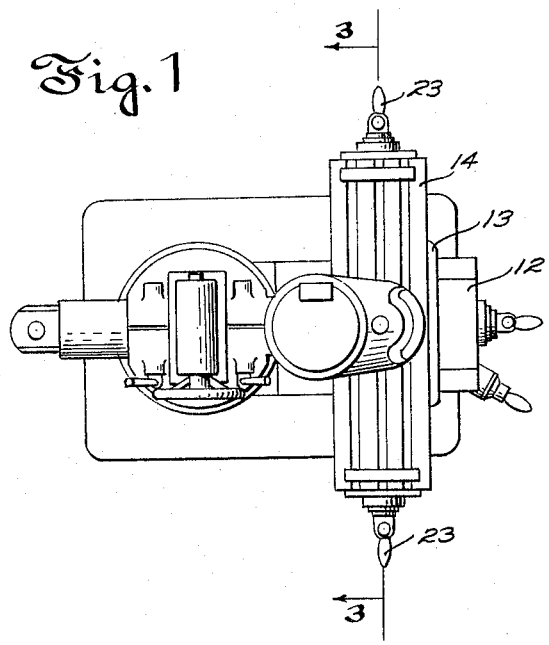
FIG. 1 is a plan view of a milling machine in whose feeding mechanism for the worktable the present improvements are incorporated.

In the drawings 12 represents the elevatable knee of a milling machine which supports, in slidable relation on ways 16, the conventional saddle 13 of the milling machine which has ways 17 guiding a relatively slidable, work carrying table 14 equipped as usual with T-slots 15 to receive the heads of holding bolts used to clamp the work (not shown) to the table.

In the form of worktable 14 herewith chosen to illustrate the invention there is, as a fixed part of the table, an internally screw-threaded lug 20 depending therefrom and running along a feed screw 21. A similar construction is shown in a copending application Serial No. 168,727, filed Jan. 25, 1962, now U.S. Patent No. 3,196,752, issued July 27, 1965. Table 14 is fed along the screw 21 and transversely of the saddle 13 by the rotation of the screw, both outboard ends of which are journaled in ball or roller bearings 22 which are lodged in the saddle at respectively opposite sides thereof. Each outboard end of the feed screw 21 carries a crank handle 23 that is freely rotatable on and relatively to a collar 24 that is rotatively interlocked with the feed screw by a spline 25. The collar 24 carries a circularly graduated dial ring 28 which turns with the collar and feed screw so that the graduations 29 on its periphery (shown in FIG. 2) come successively into register with an index mark (not shown) on a terminal face 27 of the saddle structure 13. Disk 28 can be adjusted to and held in different rotative relationships to collar 24 by means of a set screw 30.

Prior to these improvements a crank handle such as 23 has been interlocked permanently with the feed screw, or splined slidably thereon so as to be shiftable bodily in relation thereto, thus to cause the handle to be coupled rotatively with the feed screw through declutchable connection therewith. Usually that type of construction has been accompanied by an automatically declutching compression spring which constantly exerts on the crank handle a declutching bias so that the handle must be shifted bodily in an axial direction against the declutching force of such spring to enable the crank handle to turn the feed screw. Particularly where multiple rapid turns of the crank handle are necessary to feed the worktable through substantial distances of continuous movement, the double burden of "holding in" the clutch while turning the handle has been a tiring and unsatisfactory practice. On the other hand, handles fixedly united to their feed screws have proven a constant danger wherever, as in the machine herein illustrated, there is at times power-driven rotation of the feed screw.

An example of a milling machine equipped with occasionally used power means to rotate the feed screw will be found in the aforesaid copending application, Serial No. 168,727, now Patent No. 3,196,752, and is represented herein, in drawing FIG. 1. The power drive to the feed screw comprises spaced apart bevel gears 34 and 35 each journaled for free rotation in rotary bearings 36 and 37 supported by lugs 38 and 39 respectively, which lugs are integral with the framework of the saddle 13. These lugs also provide axial thrust for the beveled gears 34, 35, respectively, thus limiting their axial movement in separating directions.

The feed screw 21 can be turned by power through a transmission belt 44 running from the driving pulley or sprocket 45 of a motor 46 to a driven pulley or sprocket 47. The direction of feed screw rotation can be reversed by the axial shifting of a double-faced clutch member 48 having clutch teeth 52 on each of its opposite ends which engage respectively with mating clutch teeth 53 on the mutually facing sides of the driven bevel gears 34, 35. Clutch member 48 is slidably splined to the feed screw by means of a half-round key 54 and is manually slidable optionally to the right or to the left by shifter handle 64 having slide bearing in the brackets 65.

Both of gears 34, 35 turn freely as loose members on a threadless portion of the feed screw 21 when clutch member 48 is in neutral position, i.e. out of mesh with both of the driven bevel gears 34 and 35 but are constantly in mesh with the same driving bevel gear 49 that is fixed on the inboard end of a stub shaft 50 whose outboard end fixedly carries the aforesaid driven pulley or sprocket 47. Stub shaft 50 is journaled in a bearing 51 which may be integral with the frame structure of the saddle 13.

Figure 2:
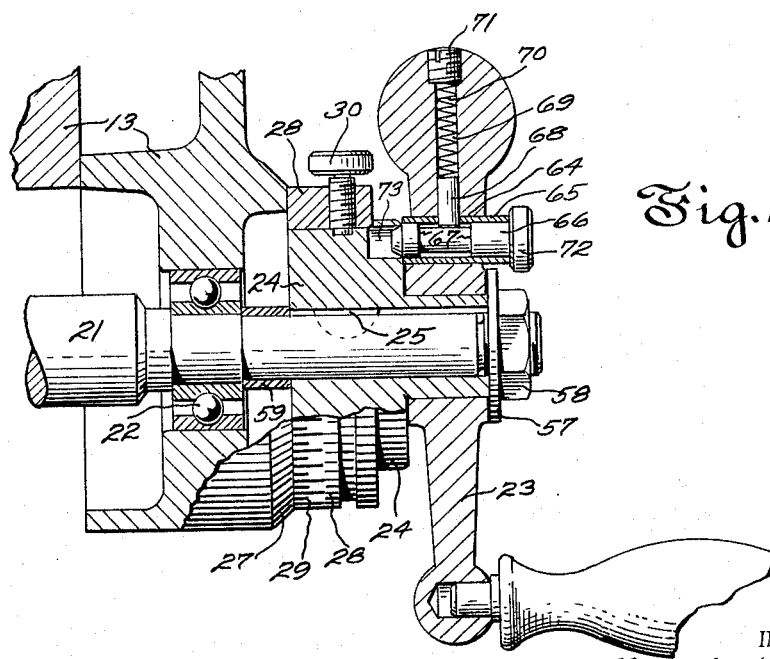
FIG. 2 is an enlargement of a certain portion of FIG. 3.

My improved coupling means that are operative drivingly to connect feed screw 21 and handle 23 are illustrated in FIG. 2 where the handle is seen to be constrained against operative movement in an axial direction relative both to the feed screw 21 and to the supporting structure or saddle 13 by a thrust washer 57 tightened against the hub of collar 24 by a nut 58 on the threaded end of feed screw 21. This forces the aforesaid collar 24 against the spacer bushing 59 between which spacer bushing and a shoulder 60 on the feed screw there is tightly clamped the inner race of ball bearing 22. To prevent rotary slippage between collar 24 and the feed screw the former is slidably splined to the latter by a half-round key 25 as hereinbefore explained.

Collar 24 is encompassed by the aforesaid dial ring 28 whose proximity to the terminal face 27 of the saddle 13 is such as to permit free turning of the dial ring for rotary adjustment on collar 24 when set screw 30 is loosened.

The hub of crank handle 23 contains at the butt end of the handle a bore 64 parallel with the axis of rotation of the handle in which there is fixedly lodged a bearing bushing 65 in which a locking pin 66 is slidable axially to an extent determined by shoulders 67 thereon which are encountered by a limit plunger 68. Plunger 68 is slidable in a hole 69 extending radially through the butt end of the crank handle and is constantly pressed against lock pin 68 by a spring 70 retained by a screw plug 71. This causes the inner end of the plunger constantly to exert frictional pressure crosswise against the lock pin 68 thus frictionally opposing its sliding in bushing 64. Such sliding however can be effected manually at all times by the finger knob 72 on the lock pin.

When lock pin 66 is manually pushed to the left in FIG. 2, its inboard end enters and occupies a socket 73 in the adjacent or outboard face of the collar 24 serving as a strike shoulder and thus coupling the crank handle positively to the collar in rotary direction. Thus by withdrawal of the plunger from the socket the feed screw may be rapidly rotated by the power mechanism shown in FIGS. 3 and 5 without causing rotation of the crank handle.

The appended claims are not intended to be limited to the mere details of construction illustrated herein, but are directed also to such equivalents of such construction as come within the broadest interpretation of the combination claimed.

What is claimed is:

1. In a machine tool the combination with a table-like member for carrying work to be machined of, an axially stationed feed screw having screw threaded driving engagement with said member, a source of power, gearing permanently connecting said source of power to said feed screw in a manner to rotate the same continuously about its own axis, a crank handle supported to rotate loosely on and coaxially of said feed screw and constrained against movement in an axial direction relative thereto, a collar remote from said gearing permanently fixed in rotary relation to said feed screw having a strike shoulder flanking said handle, and a bolt slidably carried by said handle in a manner to be shiftable manually into and out of engagement with said strike shoulder, whereby manual shifting of said bolt at a safe distance from said gearing is operative to connect and disconnect said crank handle and feed screw.

2. Mechanism in a machine tool for drivingly coupling and uncoupling a rotatable worktable feedscrew and a crank handle for manually turning the same, comprising in combination with the feed screw, supporting structure in which said feedscrew is journaled presenting an external thrust surface, a threaded terminal portion of said feed screw located in outboard relation to said thrust surface, a collar on said terminal portion slidably splined to said feed screw having an outboard directed face containing a strike shoulder and having a hub extending in outboard direction from said face, a thrust shoulder on said terminal portion of said feed screw at the inboard end of said terminal portion, a nut on the threads of said terminal portion thrusting against said hub of said collar and forcing said collar toward said thrust shoulder to an axial position limited by the latter, a crank handle retained axially between said face of said collar and said nut with sufficient axial clearance to turn freely on and in relation to said hub of said collar and said feed screw, and a bolt slidably carried by said handle in position to be thrust into and withdrawn from engagement with said strike shoulder for coupling and uncoupling said collar and said handle rotatively.

3. Mechanism as defined in claim 2, in which the said bolt comprises a stepped shank whose terminal ends are of relatively larger diameter and the mean portion of whose length is of relatively small girth thereby to provide spaced apart stop shoulders on said bolt, together with a detent plunger slidably carried by the said crank handle to intervene between said stop shoulders whereby to limit the reciprocative movement of said bolt in said crank handle.

4. Mechanism as defined in claim 3, together with a spring housed in the said crank handle in a manner to press the said plunger against the said bolt in crosswise relation to the latter whereby to produce friction yieldably opposing sliding movement of said bolt.

5. Mechanism as defined in claim 3, in which the said bolt carries a push and pull thumb knob manually accessible at the outboard face of the said crank handle.

References Cited by the Examiner
UNITED STATES PATENTS 1,355,700 10/1920 Salminen.
2,254,002 8/1941 Decker et al.

WILLIAM W. DYER, Jr., *Primary Examiner.*
G. A. DOST, *Assistant Examiner.*